May 2, 1933. F. K. RANDOLPH 1,907,333
PROCESS FOR THE SELECTIVE RECOVERY OF IODINE FROM BRINES
Filed Jan. 7, 1930
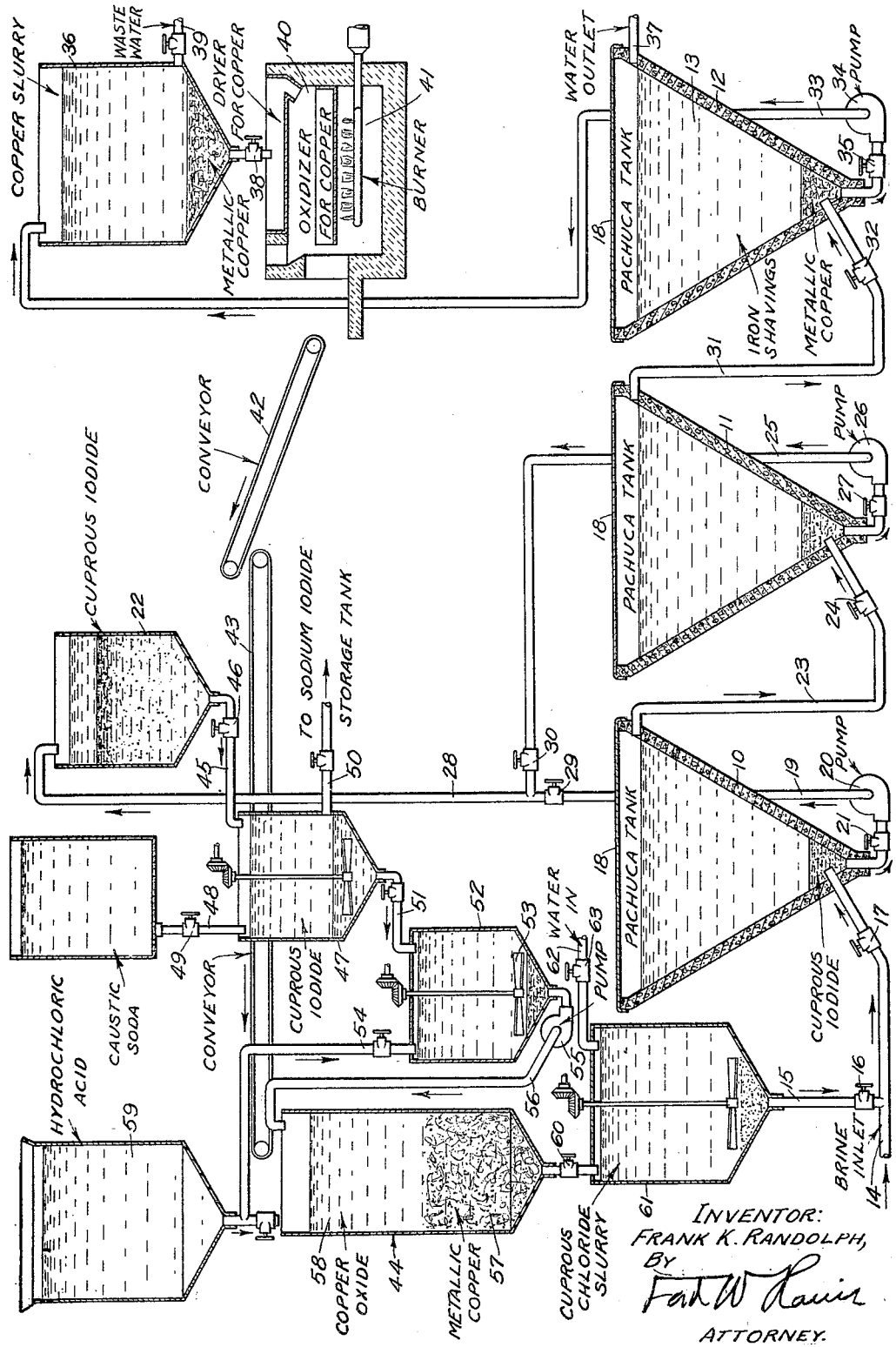
INVENTOR:
FRANK K. RANDOLPH,
By
ATTORNEY.

Patented May 2, 1933

1,907,333

UNITED STATES PATENT OFFICE

FRANK K. RANDOLPH, OF LOS ANGELES, CALIFORNIA

PROCESS FOR THE SELECTIVE RECOVERY OF IODINE FROM BRINES

Application filed January 7, 1930. Serial No. 419,051.

This invention has for its object the selective recovery of iodine from brines of subterranean origin, particularly those occurring in oil wells. The process is not confined to oil well brines however, since it may equally well be applied to any water containing any important quantity of alkali-forming metal iodide, especially if comparatively large quantities of sodium or potassium chloride are also present in the water.

The objects of the invention are the efficient, cheap and rapid recovery of the iodine in a high state of purity, and further, the efficient recovery and regeneration of the iodine-capturing agent. These objects have been realized in this invention, which concerns a cyclic process.

Briefly stated, the invention is based upon the discovery that cuprous chloride, which is substantially insoluble in pure water, is slightly soluble at ordinary temperatures in aqueous solutions of mixtures of alkali metal chlorides and iodides. The brines to which the recovery process is to be applied are such solutions and it happens that the cuprous chloride is a particularly good precipitant of the iodine in them.

I have found by actual experiment that oil well brines obtained in the neighborhood of Long Beach, California, are especially well adapted for use as a raw material of this process. The iodine exists here as dissolved sodium iodide. There are also present in this water the following: silica, iron oxide, aluminum oxide, calcium oxide, magnesium oxide, sodium oxide, potassium oxide, barium oxide, carbonic acid, chlorides, bromides, iodides, crude petroleum, dissolved naphthionic acids, "rotary mud" from drilling operations and colloidal clays of complex compositions.

A typical analysis of this water expressed as parts per million is:

| | Parts per million |
|---|---|
| Silica, $SiO_2$ | 22 |
| Iron oxide, $Fe_2O_3$ | 15 |
| Aluminum oxide, $Al_2O_3$ | 13 |
| Calcium oxide, $CaO$ | 414 |
| Magnesium oxide, $MgO$ | 266 |
| Sodium oxide, $Na_2O$ | 5080 |
| Potassium oxide, $K_2O$ | 1150 |
| Barium oxide, $BaO$ | 46 |
| Carbonic acid, $H_2CO_3$ | 196 |
| Chlorine, $Cl_2$ | 10650 |
| Bromine, $Br_2$ | 45 |
| Iodine, $I_2$ | 30 |
| Organic matter | 100 |

Because of this complex composition, the recovery of iodine has been performed heretofore by 1st.—Acidifying the water;

2nd.—Oxidizing the soluble iodide to elemental iodine;

3rd.—Absorbing the elemental iodine in an appropriate adsorbent;

4th.—Leaching out the adsorbed iodine; and

5th.—Precipitating or distilling the crude iodine from a concentrated soluble iodide.

The equipment for the older process is expensive and its operation requires constant chemical and mechanical supervision.

Many attempts have been made to precipitate iodine directly from brines, but heretofore they all failed because of the following facts:

1st.—The iodine present in the water is too small to be amenable to the formation of insoluble iodides without careful control of the alkalinity and acidity of the enormous volume of water treated.

2nd.—The precipitate does not separate without large quantities of inert constituents associated therewith.

3rd.—The chemicals used are, in all cases, many times the amount necessary to combine with the iodide because of the solvent action of the salt water upon them or because of the large amount of water present.

4th.—The period of time necessary to settle the precipitate.

The steps of my process will now be given in the form of equation, and their advantages and differences commented upon:

1st.—The soluble iodide is precipitated with cuprous chloride:

Sodium     Cuprous     Cuprous    Sodium
iodide     chloride    iodide     chloride
2NaI   +   Cu₂Cl₂  =   Cu₂I₂  +   2NaCl 2nd.—The cuprous iodide is decomposed with sodium hydroxide:

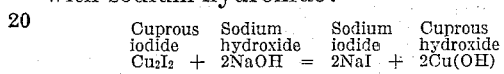
Cuprous    Sodium       Sodium     Cuprous
iodide     hydroxide    iodide     hydroxide
Cu₂I₂  +   2NaOH    =   2NaI   +   2Cu(OH)

3rd.—The cuprous hydroxide is dissolved in hydrochloric acid, whereby cuprous chloride is regenerated:

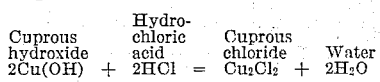
            Hydro-
Cuprous     chloric      Cuprous
hydroxide   acid         chloride    Water
2Cu(OH)  +  2HCl    =    Cu₂Cl₂  +   2H₂O 4th.—In the first, or precipitation reaction, above given, cuprous chloride forms a compound with the NaCl of the brine:

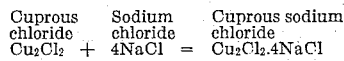
Cuprous     Sodium       Cuprous sodium
chloride    chloride     chloride
Cu₂Cl₂  +   4NaCl    =   Cu₂Cl₂.4NaCl 5th.—The copper in the cuprous sodium chloride is recovered by passing the solution over iron:

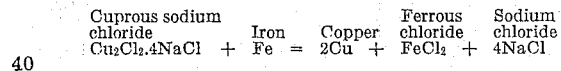
Cuprous sodium                      Ferrous     Sodium
chloride         Iron     Copper    chloride    chloride
Cu₂Cl₂.4NaCl  +  Fe   =  2Cu    +   FeCl₂   +   4NaCl 6th.—The copper is loosened from the iron, roasted to CuO and then reconverted to CuCl₂:

           Hydro-
Cupric     chloric                 Cuprous
oxide      acid       Copper       chloride    Water
CuO    +   2HCl    +  Cu       =   Cu₂Cl₂  +   H₂O In the just described process no regulation of the acidity or alkalinity nor any heating or cooling of the brine has been found necessary or desirable. Only cheap chemicals are consumed in the process, these being caustic soda, hydrochloric acid and iron. There is substantially no loss of copper.

The actual production of the free iodine from the sodium iodide obtained is performed in any conventional manner and the invention does not reside in this step except as it may be included in a combination of steps.

There have been previous attempts in the art to utilize iodine precipitating agents and even a salt as closely related to cuprous chloride as cupric sulfate is in commercial use today upon comparatively concentrated brines in Java. Cupric sulfate is, however, far from being the equivalent of cuprous chloride where brines of the iodine dilution given in the analysis of the Long Beach brine (30 parts per million) are concerned. I have determined that cupric sulfate fails to react with the iodine present in the brines in such dilution, probably on account of some operation of the mass law. Other chemical precipitants of iodine have failed of commercial success from either too little or too great a solubility in sodium chloride brine. Cuprous chloride has the great advantage of being substantially insoluble in pure water and being slightly soluble in sodium chloride solutions, so that enough is dissolved just to react with the iodine in the concentrations encountered. As hereinafter set forth the cuprous chloride is used in the form of a slurry, that is to say, a mixture of divided solid cuprous chloride with water or brine. This method of operation has the advantage that, as the slight amount of cuprous chloride in solution is depleted in the precipitating operation, it is immediately renewed or replenished from the solid constituent of the cuprous chloride slurry. Furthermore, the solid cuprous chloride in the slurry serves as a foundation or base of solid material which causes the precipitate of cuprous iodide to be deposited directly on the particles of slurry, replacing the cuprous chloride therein, thereby avoiding the formation of a colloidal or extremely finely divided precipitate. Such colloidal or extremely finely divided precipitates offer great difficulty in treatment for separation of the precipitate from the solution either by filtration or settling operation, but by causing the precipitate to be formed directly on or in the particles of a slurry of solid material, the above-mentioned difficulties of filtration or settling are avoided, the slurry being readily amenable to separation by any mechanical separating operation such as sedimentation.

My process may be considered to have three main series of steps, which are:

1.—The selective precipitation of the iodine.

2.—The recovery of the copper from the precipitate and the regeneration of the precipitant.

3.—The recovery of copper from effluent water and the regeneration of the precipitant.

In order that the inter-relation of the three series of steps may be effectively realized, the process will be described in detail as it is carried out in the apparatus shown in the accompanying drawing. This is an elevational view and is more or less diagrammatic. It is shown by way of example only since the process might be carried out in different apparatus, but has the particular merit of allowing the process to take place in a substantially continuous manner. Such operation is essential to the commercial success of the process.

In the drawing, 10, 11 and 12 each represent large conical tanks of the kind known in mining parlance as a "Pachuca" tank. These are adapted for the quick settling of heavy precipitates, particularly when their sides are at an angular inclination of 45° or somewhat greater, as shown in the tanks of the drawing which is the preferred form. The tank 10 is the locus of the main iodine precipitating reaction already discussed, while the tank 11 is merely a catch tank to recover precipitate which has escaped settling in the first tank. The third tank, No. 12, is filled with iron or steel chips or turnings 13, the function of these being to precipitate copper from the effluent water. All of the Pachuca tanks are preferably sunk into the ground nearly flush with the surface, and they may be made of concrete, wood or copper and all are provided with covers 18 to prevent oxidation of the contents.

Oil well brine is supplied to the bottom of the tank 10 through a pipe 14. Before the point at which the pipe 14 enters the tank 10, a cuprous-chloride slurry delivery pipe 15, in which there is a valve 16, joins it, so that actually a mixture of brine and cuprous chloride is delivered to the tank 10. A valve 17 is located in the pipe 14 near its discharge end for the purpose of regulating the flow into the tank 10. The end of the pipe 14 joins the tank 10 at an upward angle and extends a short distance upwardly into the tank. A pipe 19, in which there is a pump 20 and a valve 21 near the apex of the tank 10, serves for the removal of the cuprous iodide precipitate to a storage tank 22. An overflow pipe 23 connects the top of the tank 10 with the apex of the tank 11, and possesses a valve 24 near the delivery end.

The construction and piping of the tanks 11 and 12 are identical with those of the tank 10. A pipe 25, in which there is a pump 26 and a valve 27, carries settled cuprous iodide from the tank 11 to the storage tank 22, this pipe joining with the pipe 19 to make a common pipe 28. Just before the junction, valves 29 and 30 are provided in the pipes 19 and 25 respectively. An overflow pipe 31 connects the tank 11 to the apex of the tank 12 and is fitted with a valve near to its exit end. A pipe 33, in which there is a pump 34 and a valve 35, enables precipitated and loosened copper to be pumped as a slurry into copper-slurry-settling tank 36. An overflow pipe 37 from the top of the tank 12 is provided to carry exhausted purified brine to waste.

The copper-slurry-settling tank 36 is merely a conical bottomed tank with a bottom outlet 38 and a side outlet 39 at a point just clear of the normal precipitate level. Below the outlet 38 there is a copper drying oven 40 which may be superposed upon a copper oxidizing furnace 41. Any conventional apparatus suitable for the purpose may be used for these items. From the furnace 41, conveyors 42 and 43 are provided to transfer copper oxide to a percolator 44 (made of acid-proof material) for the purpose of reconverting the copper oxide into cuprous chloride.

The cuprous iodide storage tank 22 is connected by means of a bottom discharge pipe 45 in which there is a valve 46 to a conical bottomed agitator tank 47. Caustic soda solution may be fed into this tank through a pipe 48 in which there is a valve 49. The tank 47 has a side discharge pipe 50 just above the point of the normal level of the cuprous hydroxide precipitate which is formed in this tank. The pipe 50 carries sodium iodide solution to storage. A bottom discharge pipe 51 of the tank 47 delivers cuprous hydroxide to the covered cuprous-chloride-preparation tank 52, which is provided with an agitator 53. This tank is supplied with hydrochloric acid by a pipe 54, while finished cuprous chloride is delivered by means of a pump 55 and a pipe 56 to the top of the percolating tank 44.

The lower end of the tank 44 is filled with scrap metallic copper 57 in a fairly fine degree of subdivision. Above the free copper is a bed of finely divided copper oxide 58. Hydrochloric acid is supplied to the metallic and oxide beds from a storage tank 59. The bottom of the tank 44 is conical and has a bottom discharge valve 60, from which the percolated liquid may be discharged directly by gravity into cuprous-chloride-slurry-agitating tank 61, and water may be added in this tank from a pipe 62, in which there is a valve 63, the added water being just sufficient to make the slurry of the most convenient consistency. The bottom discharge pipe 15 of the tank 61 has been before mentioned as connecting into the brine supply pipe 14, the apparatus cycle being thus completed.

When operating the process with this apparatus, brine and cuprous chloride slurry are first supplied through the pipes 14 and 15 in proportions theoretically satisfying the equation for the precipitation of cuprous iodide, already given. The tank 10 has preferably some of the cuprous chloride slurry already in it before the start of operations, so as to form a locus of capture for all iodine passing through. The mixed brine and cuprous chloride then passes upwardly into the tank 10 while the generated precipitate settles into the apex of the tank. The effluent water is emptied through the pipe 23 into the apex of the tank 11, in which tank suspended solid material is enabled to settle. When the precipitate levels in the tanks 10 and 11 have reached suitable heights, the respective pumps 20 and 26 are started and the valves 21 and 27 opened so that the cuprous iodide is pumped to the tank 22 at approximately the same rate at which it is formed. The settling of the slurry to bottom of tank 11, and the pumping of the slurry from the bottom of tank 11 to the tank 22 constitutes a mechanical separating operation whereby the slurry containing cuprous iodide is separated from the remainder of the liquid.

The effluent water from the tank 11 passes through the pipe 31 and the mass of iron or steel chips or turnings in the tank 12 and upon them deposits whatever copper values it may carry, which action is represented by the equation:

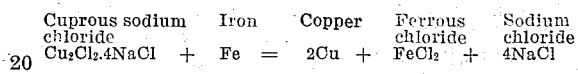

$$Cu_2Cl_2 \cdot 4NaCl + Fe = 2Cu + FeCl_2 + 4NaCl$$

The copper is only loosely adherent, so that when it is desired to pump the copper to the tank 36, the pump 34 is started and the turnings stirred manually by means of a pole to loosen the copper. The latter is allowed to settle in the tank 36, the water decanted through the discharge 39 and the copper slurry dropped through the discharge 38 into the dryer 40 and thence into the oxidizing furnace 41, where it is roasted with free access of air. The resulting copper oxide is then placed upon the conveyor 42 and dumped into the percolator tank 44.

In the meantime the cuprous iodide in the tank 22 is being continually decomposed with the theoretical quantity of caustic soda solution thus:

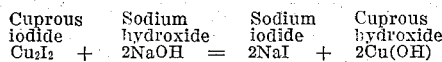

$$Cu_2I_2 + 2NaOH = 2NaI + 2Cu(OH)$$

The sodium iodide solution (maintained as concentrated as possible) is separated and sent to storage for possible later separation of iodine in any conventional manner. The cuprous hydroxide, after being separated by a mechanical separating operation, namely by settling, is discharged by gravity into the tank 52 where it is agitated with sufficient hydrochloric acid to convert it into $Cu_2Cl_2$ according to the equation:

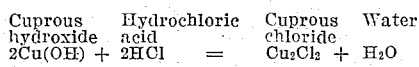

$$2Cu(OH) + 2HCl = Cu_2Cl_2 + H_2O$$

The pump 55 is then utilized to deliver the $Cu_2Cl_2$ slurry to the top of the percolator tank 44, from which point it traverses the beds of copper oxide and of metallic copper. The function of these is to maintain the $Cu_2Cl_2$ in the cuprous condition as well as to make more $Cu_2Cl_2$ from the hydrochloric acid discharged by gavity, as needed, from the tank 59. The percolate from the tank 44 is caught in the tank 61 and this is kept in agitation and a proper state of consistency by an agitator and water from the pipe 62. From the tank 61 gravity feed is utilized to inject a proper quantity of the $Cu_2Cl_2$ into the incoming fresh brine in the pipe 14, thus completing the circuit of the copper precipitant.

It is understod that this invention is confined to no particular method of making the cuprous chloride. It might, for instance, be made by treating the copper with gaseous HCl, or instead of catching the copper upon iron, the former might be precipitated as CuOH with lime water and the CuOH then dissolved in hydrochloric acid.

I claim as my invention:

1. The process of recovering iodine from brines containing it, which comprises precipitating the iodine with cuprous chloride, in the form of a slurry, subjecting the brine containing the slurry and the resultant cuprous iodide carried thereby to a mechanical separating operation so as to remove the slurry carrying the cuprous iodide from the remainder of the liquid, decomposing the cuprous iodide with caustic soda solution to obtain sodium iodide and cuprous hydroxide, subjecting the resulting solution to mechanical separating operation to separate the cuprous hydroxide from the solution, and subjecting the cuprous hydroxide to the action of a suitable chloridizing agent so as to produce cuprous chloride for re-use.

2. The process of recovering iodine from brines containing it in combination with alkali-forming metals which comprises the step of adding to such brines a slurry of cuprous chloride in substantially the theoretical quantity necessary to precipitate all of the iodine and then passing the mixture through additional cuprous chloride.

3. A step in the process of obtaining iodine from iodine-containing brine which comprises subjecting the brine to an upward flow through a slurry of cuprous chloride.

4. In a process of recovering iodine from iodine-containing brines, the operation which comprises contacting the brines to be treated with cuprous chloride, in the form of a slurry and subjecting the liquid containing the resulting cuprous iodide in the form of a slurry to mechanical separating operation to separate the solid content thereof from the liquid.

In testimony whereof, I have hereunto set my hand at Los Angeles, California, this 27th day of December, 1929.

FRANK K. RANDOLPH.